United States Patent
Maamari

(10) Patent No.: US 11,002,313 B2
(45) Date of Patent: May 11, 2021

(54) ACTIVE AEROSTATIC BEARING

(71) Applicant: ETEL S.A., Motiers (CH)

(72) Inventor: Nadim Maamari, Neuchatel (CH)

(73) Assignee: ETEL S.A., Motiers (CH)

( * ) Notice: Subject to any disclaimer, the term of this patent is extended or adjusted under 35 U.S.C. 154(b) by 0 days.

(21) Appl. No.: 16/648,681

(22) PCT Filed: Jul. 4, 2018

(86) PCT No.: PCT/EP2018/068064
§ 371 (c)(1),
(2) Date: Mar. 19, 2020

(87) PCT Pub. No.: WO2019/057360
PCT Pub. Date: Mar. 28, 2019

(65) Prior Publication Data
US 2020/0217364 A1    Jul. 9, 2020

(30) Foreign Application Priority Data

Sep. 21, 2017  (EP) .................................. 17192381.6

(51) Int. Cl.
*F16C 32/06*     (2006.01)
*F16C 29/02*     (2006.01)

(52) U.S. Cl.
CPC ........ *F16C 32/0622* (2013.01); *F16C 29/025* (2013.01); *F16C 32/0607* (2013.01); *F16C 32/0674* (2013.01); *F16C 2380/18* (2013.01)

(58) Field of Classification Search
CPC .... F16C 29/025; F16C 32/06; F16C 32/0603; F16C 32/0607; F16C 32/0614;
(Continued)

(56) References Cited

U.S. PATENT DOCUMENTS

| | | | |
|---|---|---|---|
| 4,045,098 A | | 8/1977 | Blondeel |
| 4,073,549 A | * | 2/1978 | Christ ................. F16C 32/0666 |
| | | | 384/122 |

(Continued)

FOREIGN PATENT DOCUMENTS

| | | |
|---|---|---|
| DE | 2544872 A1 | 4/1976 |
| EP | 0065337 B1 | 11/1984 |

(Continued)

OTHER PUBLICATIONS

Ron A.J. van Ostayen, et al., "Design and Optimization of an Active Aerostatic Thrust Bearing", Jan. 2007, pp. 1-4.
(Continued)

*Primary Examiner* — Phillip A Johnson
(74) *Attorney, Agent, or Firm* — Leydig, Voit & Mayer Ltd.

(57) ABSTRACT

An active aerostatic bearing comprises a first plate and a force actuator. The first plate has a central recess area including an orifice forming an inlet restrictor for pressurized air from a central nozzle. The pressurized air forms an air gap between a guiding surface and the first plate. The force actuator is configured to act to deform the first plate so as to change a shape of the air gap, wherein the actuator is configured to cause a conical deformation of the first plate.

13 Claims, 4 Drawing Sheets

(58) Field of Classification Search
CPC .............. F16C 32/0622; F16C 32/0625; F16C 32/0666; F16C 32/067; F16C 32/0674; F16C 2380/18
See application file for complete search history.

(56) References Cited

U.S. PATENT DOCUMENTS

| | | | | |
|---|---|---|---|---|
| 4,310,204 | A | * | 1/1982 | Christ ................. F16C 32/0666 384/106 |
| 4,449,834 | A | | 5/1984 | Franken et al. |
| 4,560,213 | A | | 12/1985 | Enderle et al. |
| 6,276,491 | B1 | * | 8/2001 | Schonfeld ............. F16C 29/025 137/501 |
| 8,333,512 | B2 | | 12/2012 | Huang et al. |

FOREIGN PATENT DOCUMENTS

| | | |
|---|---|---|
| EP | 0143471 B1 | 2/1990 |
| EP | 2251556 A1 | 11/2010 |
| JP | 2008144918 A | 6/2008 |
| NL | 1022964 C1 | 9/2004 |

OTHER PUBLICATIONS

Ro S K et al: "A Linear Air Bearing Stage with Active Magnetic Preloads for Ultraprecise Straight Motion", Precise Engineering, vol. 34, No. 1, Jan. 1, 2010 (Jan. 1, 2010), pp. 186-194, XP026708768.

\* cited by examiner

ACTIVE AEROSTATIC BEARING

CROSS-REFERENCE TO PRIOR APPLICATIONS

This application is a U.S. National Phase Application under 35 U.S.C. § 371 of International Application No. PCT/EP2018/068064, filed on Jul. 4, 2018, and claims benefit to European Patent Application No. EP 17192381.6, filed on Sep. 21, 2017. The International Application was published in English on Mar. 28, 2019 as WO 2019/057360 under PCT Article 21(2).

FIELD

The invention relates to the field of aerostatic bearings. Semiconductor manufacturing is an example for a technical field that is highly dependent on precision positioning systems. Multiple types of guiding such as mechanical, aerostatic, and magnetic bearings have been developed to enhance the performance of such positioning systems. Aerostatic bearings offer the best precision to cost ratio. Actuators added to an aerostatic bearing render the aerostatic bearing active.

BACKGROUND

Aerostatic bearings have been extensively used in precision motion systems, specifically in semiconductor manufacturing and inspection. The absence of stick-slip effect in aerostatic bearings results in a precise and repeatable motion. Aerostatic bearings preserve a clean environment, as they require no oil lubrication. They comprise two parts: a guiding surface (which is usually lapped to have a low surface roughness) on which slides a pad which includes the air pressure supply and a lower surface with an orifice through which the air flows. Aerostatic Bearings are generally classified based on the type of inlet restrictor. Those with a centrally fed orifice are commonly employed due to their ease of manufacturing.

Pressurized air is forced into a pad. The orifice acts as an inlet restrictor, and the exhaust restrictor is composed by the thin gap between the guiding surface and the pad's lower surface. Loading/unloading the pad changes the pressure distribution resulting from the alteration of the gap height and the recess pressure.

One of the disadvantages of air bearings is their limited static stiffness. Indeed, a change of load results in a change of gap height which can lead to inaccuracies in high precision machines. Static stiffness can be increased by changing the exhaust restrictor. A deformable membrane can replace the pad's lower surface. In this case, the response of the pad involves both rigid body motion and the deformation of the membrane. EP 0143471 B1 suggests adding a pivoting membrane that allows an infinite static stiffness. EP 0065337 B1 suggests extending the range of infinite stiffness by using inner and outer gas chambers.

The main disadvantage of these passive load compensation methods is the requirement of pressurized chambers, adding to manufacturing complexities. Additionally, the geometric inaccuracies of the guiding surfaces remain uncompensated. Actively controlled air bearings offer a way to overcome these limitations and add a macro-positioning capability to compensate for the geometrical inaccuracies of the guiding surface.

Active compensation strategies can be grouped into two categories: flow restriction control and gap geometry control. The main limitation of flow restriction control is in its limited bandwidth caused by the latency in the response.

Gap geometry control offers a collocated actuation. In this approach, the force of an actuator acts directly on the gap geometry and instantly changes the pressure distribution. The simplest means of gap actuation method is described by Roe et al. (S.-K. Ro, S. Kim, Y. Kwak, and C. H. Park, "A linear air bearing stage with active magnetic preloads for ultraprecise straight motion," Precis. Eng., vol. 34, no. 1, pp. 186-194, January 2010): The linear axes uses four iron core motors with permanent magnets to actively preload a set of eight porous media air bearings.

Van Ostayen et al. (Ron A. J. van Ostayen, Anton van Beek, and Rob Munnig-Schmidt, "Design and Optimization of an Active Aerostatic thrust Bearing," ASPE Annu. Conf. October 2007) presented a design with an active pad supported in the center, with a flexible plate with intermediate circumferential support, and an electromagnetic actuator mounted on the edge of the pad to deform the plate. This method increases the design complexity because it involves a plate deformation. A membrane-like thin plate is required to obtain high mechanical stiffness comparable to passive load compensation levels. However, membrane-like thin plates under point loading cause local deformation. Thus, the servo force will not affect the pressure and gap height across the whole pad, limiting the servo's impact on the load capacity and thus requiring a high-density servo actuator to change the load capacity.

SUMMARY

In an embodiment, the present invention provides an active aerostatic bearing comprising a first plate and a force actuator. The first plate has a central recess area including an orifice forming an inlet restrictor for pressurized air from a central nozzle. The pressurized air forms an air gap between a guiding surface and the first plate. The force actuator is configured to act to deform the first plate so as to change a shape of the air gap, wherein the actuator is configured to cause a conical deformation of the first plate.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides an active aerostatic bearing that shows improved behavior when compared to prior art systems.

Preferably, the active aerostatic bearing has high passive mechanical stiffness for disturbance rejection without the requirement of gap measurement, while maintaining a high servo compliance to compensate the geometrical inaccuracies of the guiding. "Disturbance rejection" designates the ability of the bearing to maintain its position (gap height) when the load changes. "Servo compliance" designates the ability to deliberately set the position of the bearing using the actuator.

An active aerostatic bearing according to an embodiment of the present invention comprises a lower or first plate, with a central recess area including an orifice forming an inlet restrictor for pressurized air from a central nozzle. An air gap is formed between a guiding surface and the first plate. The active aerostatic bearing comprises a force actuator acting to deform the first plate and thus changing the shape of the air gap. The actuator causes a conical deformation of the first plate. Preferably, the first plate, a second plate and four pivoting points are forming a parallelogram, the shape of the parallelogram being changeable by actuating the actuator.

The conical deformation of the first plate has several advantages. The conicity actuation allows balancing perfectly the pressure and servo induced deformation of the first plate, thus any load capacity within theoretical limits is attainable with a low actuator force of ±1 N. This balance is achieved by ensuring the linear (conical) gap deformation along the radial direction. The servo actuation is performed using a simple voice coil motor (Lorentz actuator), injecting both the action and reaction forces into the pad.

The active aerostatic bearing presented overcomes the dilemma between servo compliance and disturbance rejection. The lower surface of the pad is made compliant using a parallelogram based on leaf springs, ensuring a linear gap deformation along the radial directions. This linearity enables Lorentz actuators to reproduce any pressure-induced deformation.

Figure 1:
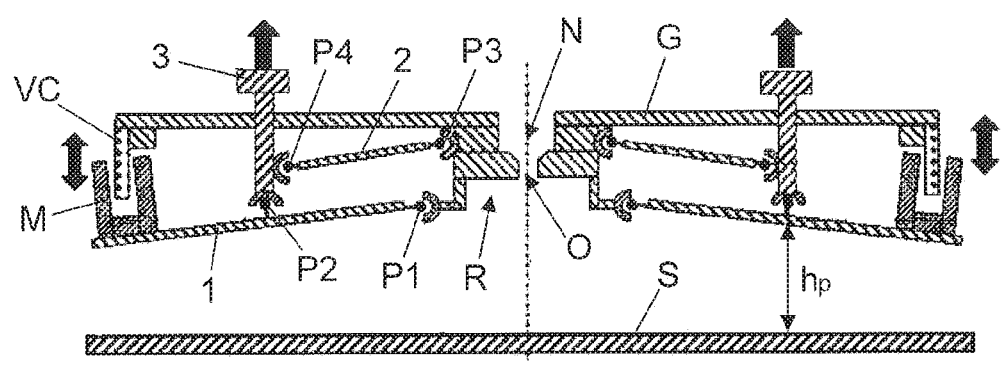
FIG. 1 shows a simplified mechanical concept of a first embodiment of the present invention.

A simplified axial section of the mechanical concept of the active aerostatic bearing according to the invention is represented in FIG. 1. The compliant surface consists of a lower or first plate 1 with two pivoting points P1, P2. The first pivoting point P1 is located next to a central nozzle N with a recess region R with an orifice O, and the second pivoting point P2 is located at a fixture 3, at a radial distance approximately ⅔ of the radius of the compliant surface. The fixture 3 carries the weight of the application. The orifice O of the central nozzle N acts as an inlet restrictor for pressurized air. The exhaust restrictor is composed by the thin gap between the guiding surface S and the first plate 1.

An upper or second plate 2 with also two pivoting points P3, P4 is located above the first plate 1. The third pivoting point P3 is located next to the nozzle N and above the first pivoting point P1, the fourth pivoting point P4 is located at the fixture 3, above the second pivoting point P2. The combination of first and second plates 1, 2, nozzle N and fixture 3 and pivoting points P1, P2, P3, P4 constitutes a parallelogram ensuring the guiding of the conicity of the compliant surface of the first plate 1.

The servo compliance is produced using a simple voice coil VC with zero stiffness that does not alter the conicity compliance. The voice coil VC is attached to a glider G. This glider G has no rigid mechanical connection to the fixture 3.

To ensure a torque injection upon servo actuation, magnets M are attached to the outer rim of the first plate 1 and the coil VC is mounted on the glider G which is rigidly attached to pivoting points P1 and P3. The continuous force required to change the conicity is well within the force density offered by Lorentz type based actuation, which is typically from −1 N to +1 N.

Figure 2:
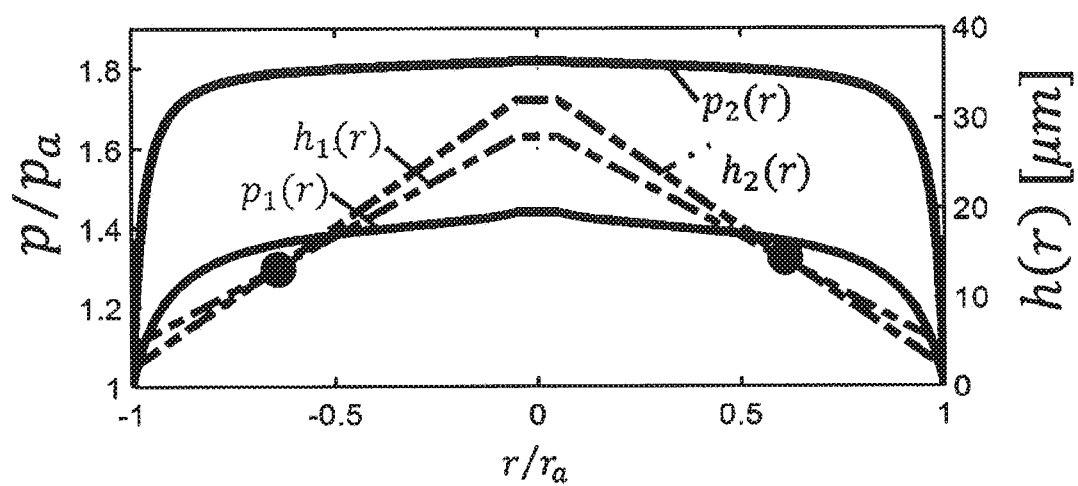
FIG. 2 shows pressure and gap size of the first embodiment as a function of radial distance from the center of the pad.

To illustrate the infinite stiffness, simulation studies and literature demonstrate that the pressure induced conicity alters the pressure distribution p1(r), p2(r) and the recess pressure while maintaining nominal gap height hp (measured at the second pivoting point P2) constant, as shown in FIG. 2. The linear gap deformation h(r) along the radial direction allows any pressure induced conicity to be reproduced or cancelled by the servo motor. Therefore, the servo can generate any pad loading, if the pad response involves predominantly a high conicity, which is the case for quasi-infinite stiffness.

Figure 3:
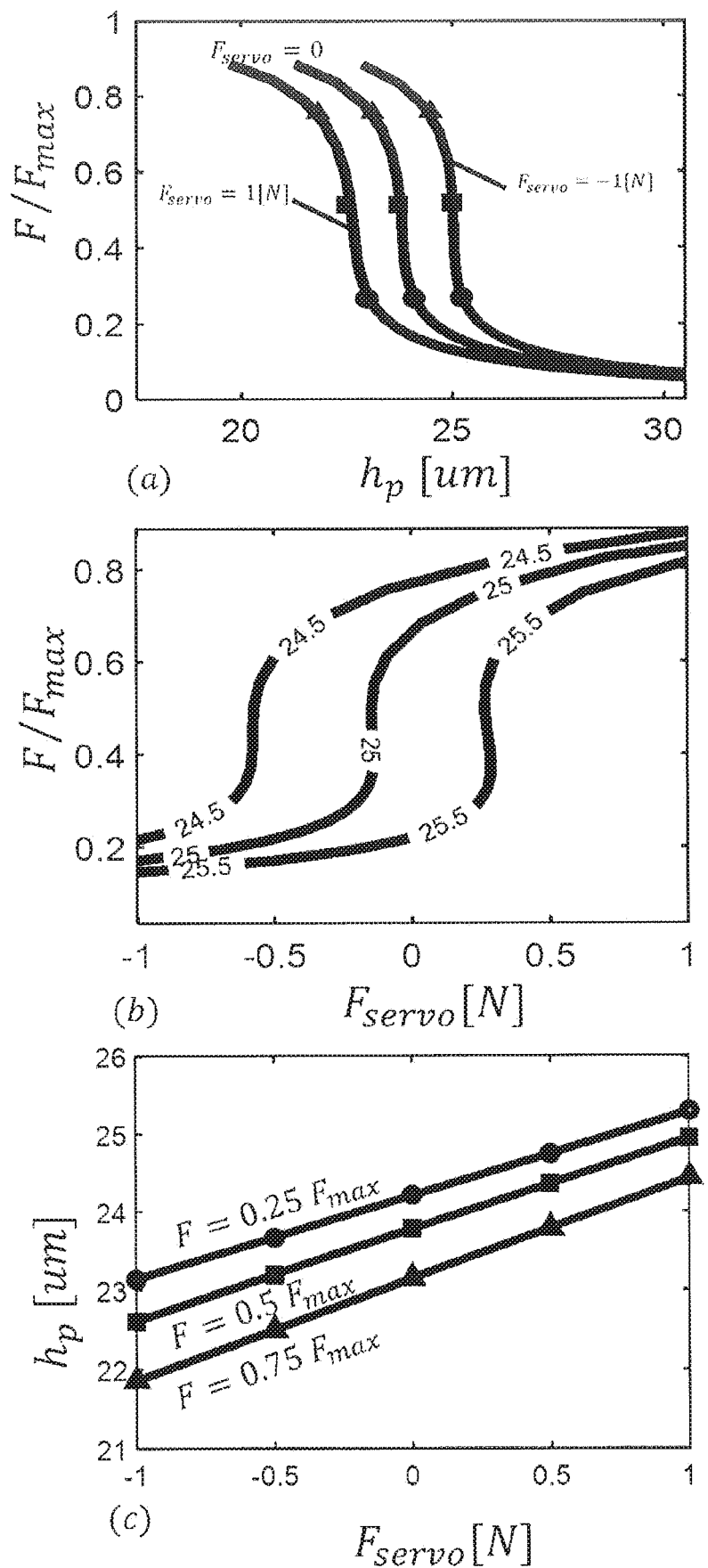
FIG. 3 shows simulation results regarding the first embodiment.

Simulation results are shown in FIG. 3. The load capacity curves for different forces $F_{servo}$=−1N/0N/1N is presented in FIG. 3(a), normalized to maximum load capacity. The region of quasi-infinite stiffness can be clearly observed around the point of 0.4-0.5 $F_{max}$. The contour plot in FIG. 3(b) represents the change in load capacity under a constant gap height $h_p$. It shows a dramatic amplification of the servo force, i.e. along the curve for a nominal height $h_p$=25 μm, the load capacity varies from 0.2 to 0.9 of the maximum bearing load, with a servo force range of ±1 N. This amplification is achieved because the small servo force can reproduce exactly the pressure-induced conicity as illustrated in FIG. 2. This possibility was missing in prior art solutions.

The servo compliance is defined as nominal gap height $h_p$ variation under voice coil actuation, while maintaining the same load capacity, shown in FIG. 3(c). This definition is only valid when the air pad is under a constant pre-loading condition (gravity, vacuum). The motor force constant was calculated at 3.4 N/A. The results show a servo compliance, in the range of 3.46 to 4.42 μm/A within the loading range of high stiffness 0.8 Fmax to 0.2 Fmax.

Figure 4:
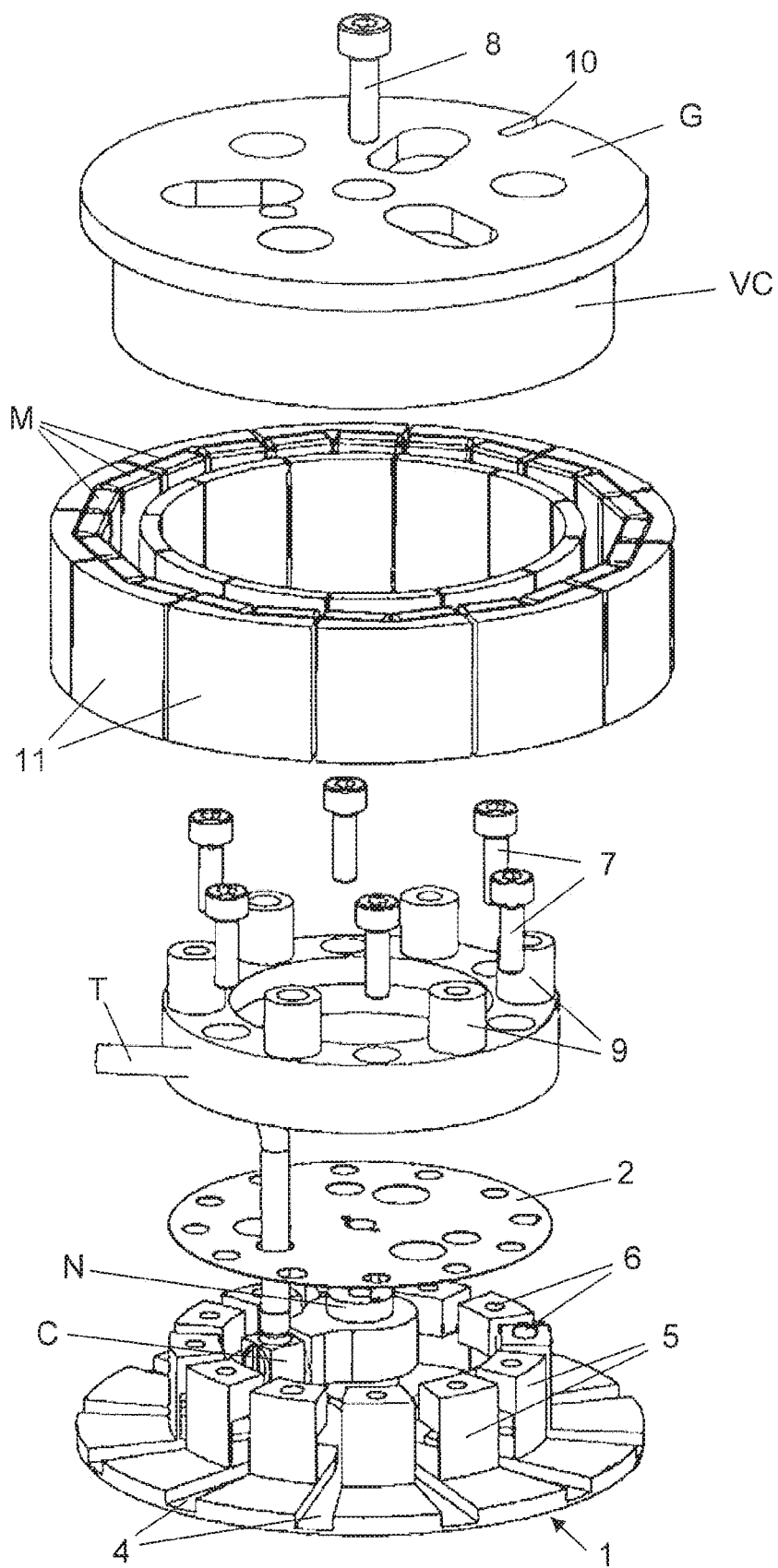
FIG. 4 shows an exploded view of a second embodiment of the present invention.
Figure 5:
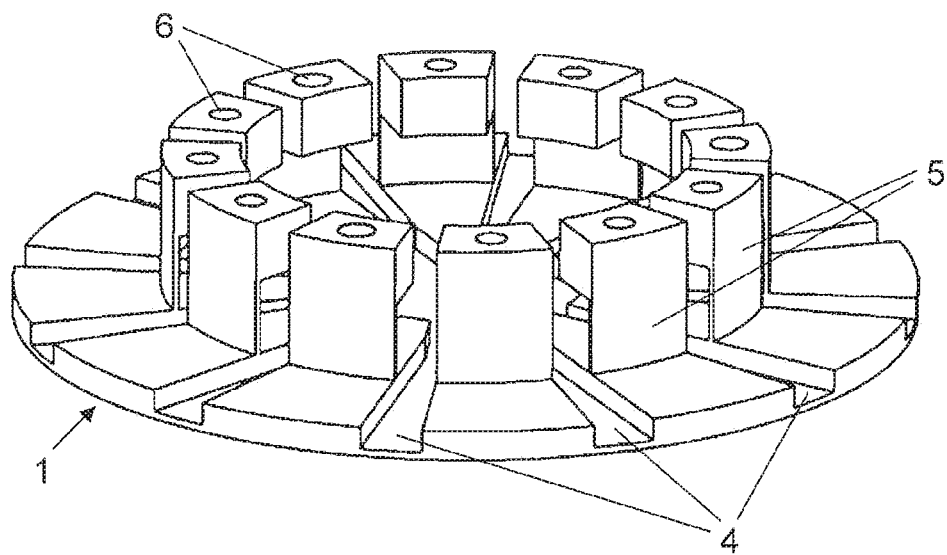
FIG. 5 shows a detailed view of the compliant plate of the second embodiment.
Figure 6:
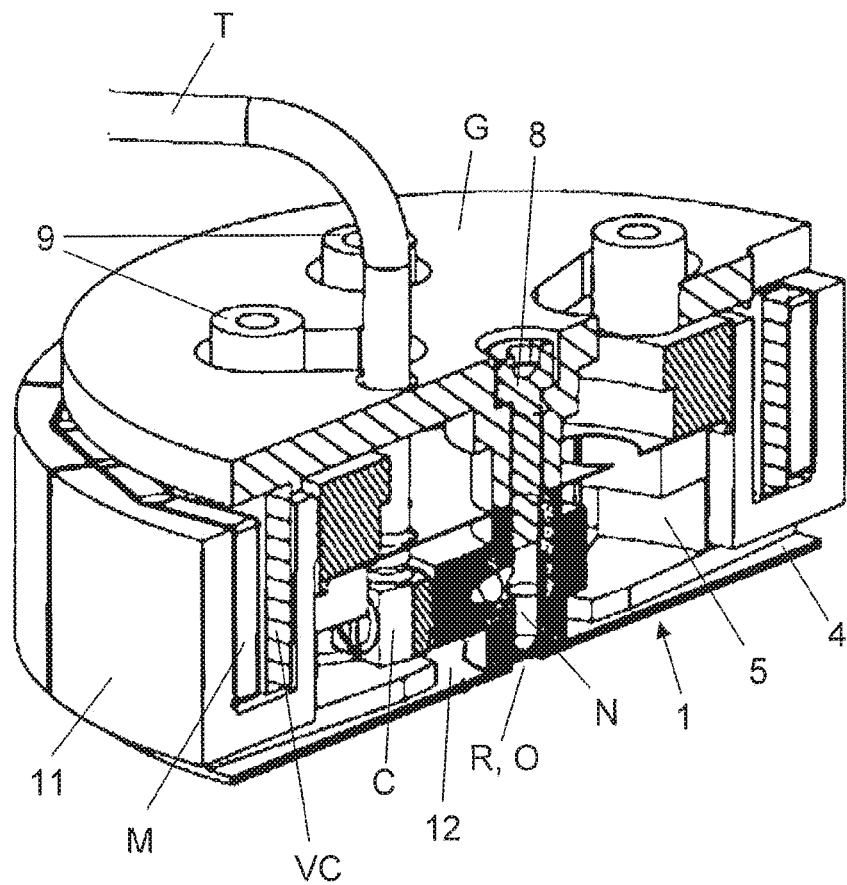
FIG. 6 shows a sectioned view of the second embodiment.

Next, a detailed design of an active aerostatic bearing according to the invention will be described. FIG. 4 shows an exploded view of the bearing, FIG. 5 shows the first plate 1 in detail, and FIG. 6 shows the bearing in an assembled state, with a section through the center of the bearing to highlight its components.

The lower surface of the compliant or first plate 1 needs to deform similarly to a cone. Such a conical deformation leads to a gap height that varies linearly in the radial direction. The inclination of the lower surface with respect to the guiding surface S can be changed with the actuator. For the simplified model the pivoting points P1, P2 are enough to ensure such conical or linear deformation. However, for the first plate 1 according to the second embodiment, radial grooves 4 are foreseen to ensure that the first plate 1 is compliant enough for pressure and servo induced deformation. Between these radial grooves 4, a pivoting point is created using thin vertical leaf springs 5. These leaf springs 5 correspond to the pivoting point P2 of FIG. 1. Pivoting point P1 is formed by a central circular region 12 of first plate 1 around the nozzle N. The circular region is sufficiently thin to deform.

At the top of the vertical leaf springs 5, threaded holes 6 are foreseen to fix them to a circular leaf spring 2 and the external interface. The circular leaf spring 2 acts as a second plate 2 when compared with FIG. 1. The first plate 1 is easily manufactured as a one-piece part from an aluminum block, first with a turning operation, and then a milling operation to create the grooves 4. Twelve regularly spaced grooves 4 around the circumference are foreseen, while a minimum of three is required. The lower surface of the first plate 1 is lapped to reach adequate surface roughness and flatness. The first plate 1 has also a central hole (Ø2-3 mm) to create a recess region R. Its thickness ranges from 500 μm inside the grooves and the central circular region to 3 mm between the grooves.

The nozzle N is glued in the center of the first plate 1 using a tool ensuring concentricity between the first plate 1 and nozzle N. The nozzle N comprises a central hole, with a threaded upper part (to interface the glider G) and at the bottom a calibrated orifice O for air pressure outlet (in the range of Ø100 μm). On its side, a connector C is foreseen for the air pressure inlet.

The second plate 2, a circular steel leaf spring in the shape of a disk of 100 μm thickness, closes the kinematic chain and guides the deformation of the first plate 1 and the vertical motion of the nozzle N, eliminating any parasitic deformation. It is clamped between the pad fixture 3 and the vertical leaf springs 5 of the first plate 1 by screws 7, and at the center is it clamped between the glider G and the nozzle N using a central screw 8 and alignment pins. Pivoting points P3 and P4 are created by the deformation of the second plate 2.

Two openings are foreseen in the second plate 2 for the nozzle N and the air pressure inlet tube T. Other holes appearing in drawings are used for capacitive sensor measurement for testing purposes only.

First plate 1 and second plate 2 are mechanically connected to the vertical leaf springs 5 and to the nozzle N, together forming a parallelogram when viewed at in an axial section through the center of the bearing. Each of the twelve sectors between the radial grooves 4 of the first plate 1 can be compared to the parallelograms shown in the more theoretical model of FIG. 1. The conicity of the compliant surface of the first plate 1 can be ensured by segmenting the first plate 1 with radial grooves 4 and by using a circular leaf spring as a second plate 2. The circular leaf spring 2 and the vertical leaf springs 5 account for the necessary pivoting points of the parallelogram.

The pad fixture 3 is made of aluminum and comprises a ring with 12 holes for screws 7 to assemble the pad. Six mounting lugs 9 extend above the upper surface of the pad fixture to create the mechanical interface of the pad to the motion system. These mounting lugs 9 extend through the glider G without any mechanical contact.

The glider G is fixed to the nozzle N with the central screw 8. Glider G carries a circular voice coil VC, which is used to create the servo force. Glider G possesses 6 holes through which the mounting lugs 9 pass. A groove 10 on one side of the glider G is foreseen for the supply wires of the voice coil VC.

The U-shape back iron 11 of the magnetic way closes the magnetic flux of the magnets M through the circular voice coil VC mounted on the Glider G. The magnets M can be cylindrical segments, or as shown here, can comprise rectangular segments disposed on a regular polygon. The U-shape back iron 11 is glued to the first plate 1 so that the servo force deforms the conicity of the latter. The U-shape back iron 11 is sectored (in this case 12 segments) in a similar manner as the first plate 1 so as to maintain a conicity compliance.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An active aerostatic bearing comprising:
   a first plate with a central recess area including an orifice forming an inlet restrictor for pressurized air from a central nozzle, the pressurized air forming an air gap between a guiding surface and the first plate; and
   a force actuator configured to act to deform the first plate so as to change a shape of the air gap, wherein the actuator is configured to cause a conical deformation of the first plate.

2. The active aerostatic bearing according to claim 1, wherein the first plate, a second plate and four pivoting points form a parallelogram, the shape of the parallelogram being changeable by actuating the actuator.

3. The active aerostatic bearing according to claim 2, wherein the second plate comprises a circular leaf spring.

4. The active aerostatic bearing according to claim 2, wherein the first plate comprises radial grooves which form sectors between the radial grooves.

5. The active aerostatic bearing according to claim 4, wherein the sectors of the first plate comprise vertical leaf springs, the vertical leaf springs being connected to the second plate.

6. The active aerostatic bearing according to claim 5, wherein the first plate and the vertical leaf springs are a one-piece part.

7. The active aerostatic bearing according to claim 5, wherein the center of the first plate and the center of the second plate are mechanically connected to the nozzle.

8. The active aerostatic bearing according to claim 7, wherein the first plate, the second plate, the nozzle and the vertical leaf springs form the parallelogram.

9. The active aerostatic bearing according to claim 5, wherein the second plate and the vertical leaf springs are mechanically connected to a fixture with screws.

10. The active aerostatic bearing according to claim 9, wherein the actuator comprises a glider, and wherein there is no rigid mechanical connection between the glider and the fixture.

11. The active aerostatic bearing according to claim 2, wherein the first plate is a lower plate and the second plate is an upper plate.

12. The active aerostatic bearing according to claim 1, wherein the actuator is of the Lorentz type and comprises a voice coil mechanically connected to a glider and magnets mechanically connected to the first plate.

13. The active aerostatic bearing according to claim 12, wherein the magnets are fixed to a U-shaped back iron, the back iron being mechanically connected to the first plate.

* * * * *